(12) United States Patent
Taniguchi et al.

(10) Patent No.: US 9,463,411 B2
(45) Date of Patent: Oct. 11, 2016

(54) CARBON DIOXIDE CHEMICAL ABSORPTION SYSTEM INSTALLED WITH VAPOR RECOMPRESSION EQUIPMENT

(71) Applicant: BABCOCK-HITACHI KABUSHIKI KAISHA, Tokyo (JP)

(72) Inventors: Noriaki Taniguchi, Hiroshima (JP); Jun Shimamura, Hiroshima (JP); Toshio Katsube, Hiroshima (JP); Hideaki Higashi, Hiroshima (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 199 days.

(21) Appl. No.: 14/364,205

(22) PCT Filed: Dec. 14, 2012

(86) PCT No.: PCT/JP2012/007997
§ 371 (c)(1),
(2) Date: Jun. 10, 2014

(87) PCT Pub. No.: WO2013/088731
PCT Pub. Date: Jun. 20, 2013

(65) Prior Publication Data
US 2014/0345465 A1  Nov. 27, 2014

(30) Foreign Application Priority Data

Dec. 14, 2011  (JP) ................................. 2011-273370

(51) Int. Cl.
*B01D 53/14* (2006.01)
(52) U.S. Cl.
CPC ....... *B01D 53/1425* (2013.01); *B01D 53/1475* (2013.01); *B01D 53/1493* (2013.01);
(Continued)
(58) Field of Classification Search
CPC .............. B01D 2252/204; B01D 2252/20478; B01D 2257/504; B01D 2258/0283; B01D 53/1425; B01D 53/1475; B01D 53/1493; Y02C 10/04; Y02C 10/06
See application file for complete search history.

(56) References Cited

U.S. PATENT DOCUMENTS 6,689,332 B1 * 2/2004 Yoshida ............. B01D 53/1475
423/220

FOREIGN PATENT DOCUMENTS

EP      2 668 996 A1    12/2013
JP      2011-62700       3/2011
(Continued)

OTHER PUBLICATIONS

Supplementary European Search Report completed Jul. 2, 2015 for Application No. EP 12 85 8675.
(Continued)

*Primary Examiner* — Duane Smith
*Assistant Examiner* — Cabrena Holecek
(74) *Attorney, Agent, or Firm* — Fay Sharpe LLP

(57) ABSTRACT

An exhaust gas treatment system comprising: a $CO_2$ chemical absorption equipment comprising an absorption column which absorbs carbon dioxide ($CO_2$) in a combustion exhaust gas discharged from a combustion device with the use of an absorbing solution comprising an amine compound as a main component and a regeneration column which regenerates the absorbing solution by desorbing $CO_2$ from the absorbing solution which absorbed $CO_2$; a flash tank which depressurizes the absorbing solution withdrawn from a lower part of the regeneration column to flash-evaporate the absorbing solution; a vapor recompression equipment which compresses the vapor generated by the flash tank; a temperature control device which adjusts the vapor compressed by the vapor recompression equipment to be within a predetermined temperature; and a piping for feeding the vapor adjusted to the predetermined temperature by the temperature control device to the regeneration column.

7 Claims, 8 Drawing Sheets

(52) U.S. Cl.
CPC ............... *B01D2252/204* (2013.01); *B01D 2252/20478* (2013.01); *B01D 2257/504* (2013.01); *B01D 2258/0283* (2013.01); *Y02C 10/04* (2013.01); *Y02C 10/06* (2013.01)

(56) References Cited

FOREIGN PATENT DOCUMENTS

| | | |
|---|---|---|
| JP | 2011-506081 | 3/2011 |
| JP | 2011-115779 | 6/2012 |
| NO | WO 2010142716 A1 * 12/2010 ......... B01D 53/1425 |
| WO | WO 2010/142716 A1 | 12/2010 |
| WO | WO 2011/162869 A1 | 12/2011 |

OTHER PUBLICATIONS

International Search Report mailed Jan. 15, 2013 for International application No. PCT/JP2012/007997.

\* cited by examiner

--Prior Art--

CARBON DIOXIDE CHEMICAL ABSORPTION SYSTEM INSTALLED WITH VAPOR RECOMPRESSION EQUIPMENT

TECHNICAL FIELD

The present invention relates to a carbon dioxide ($CO_2$) chemical absorption system installed with a vapor recompression equipment. More specifically, the present invention relates to a carbon dioxide ($CO_2$) chemical absorption system installed with a vapor recompression equipment and an exhaust gas treatment system comprising the carbon dioxide chemical absorption system, each of which is capable of utilizing a vapor obtained by flash-evaporating a part of an absorbing solution withdrawn from a regeneration column as a heat source of the regeneration column by recompressing the vapor and of suppressing deterioration of the absorbing solution otherwise caused by excessive heating by adjusting a temperature of the vapor to be within a predetermined range (for example, 110° C. to 120° C.).

BACKGROUND ART

A large amount of carbon dioxide is generated from a thermal power generation equipment or a boiler equipment due to combustion of a fuel such as coal and heavy oil. In recent years, from the viewpoint of air pollution and global warming, there has been a worldwide movement of restricting an emission of carbon dioxide to the atmosphere. As one of $CO_2$ separation/recovery technologies, a method of causing an absorbing solution containing an amine compound such as alkanolamine to absorb carbon dioxide, i.e. a so-called $CO_2$ chemical absorption, has widely been known.

One example of power generation plants comprising a conventional $CO_2$ chemical absorption system is shown in FIG. 8. The power generation plant comprises a boiler 1, a denitrification device 2, an air heater 3, an electric dust collection device 4, a wet desulfurization device 5, a pre-scrubber 10, a $CO_2$ absorption column 20, a regeneration column 40, a reboiler 60, and so forth. A combustion exhaust gas discharged from the boiler 1 due to combustion of a fossil fuel such as coal is subjected to removal of nitrogen oxide in the denitrification device 2. After that, the exhaust gas is subjected to heat exchange in the air heater 3, followed by cooling to 120° C. to 170° C., for example. The exhaust gas after passing through the air heater 3 is subjected to removal of particulate matters in the electric dust collector 4. Subsequently, the exhaust gas is subjected to removal of sulfur oxide ($SO_2$) in the wet desulfurization device 5 while increasing a pressure by an induced draft fan. Since about several tens of ppm of $SO_2$ can sometimes remain in the outlet gas at the wet desulfurization device 5, the residual $SO_2$ is minimized (e.g. to 10 ppm or less) by the prescrubber 10 disposed in front of the $CO_2$ chemical absorption equipment to prevent the residual $SO_2$ from deteriorating an absorbing solution circulating in the $CO_2$ absorption column 20.

The $CO_2$ absorption column 20 comprises a packing layer 21, an absorbing solution spray unit 22, a water washing unit 24, a water washing spray unit 25, a demister 26, a washing water reservoir 27, a cooler 28, a washing water pump 29, and so forth. $CO_2$ contained in the exhaust gas is absorbed by the absorbing solution by gas-liquid contact in the packing layer 21 with the absorbing solution fed from an absorbing solution spray unit disposed at an upper part of the $CO_2$ absorption column 20. Since the exhaust gas from which $CO_2$ is removed (non-$CO_2$ gas) is increased in temperature due to heat generated during the absorption reaction and is entrained with a mist, cooling and mist removal are performed in the water washing unit 24, and the mist is further removed in the demister 26 disposed above the water washing unit 24. After that, the exhaust gas is emitted as a treated gas 37 (non-$CO_2$ gas). The washing water cooled in the cooler 28 is used circularly by the washing water pump 29.

The absorbing solution after absorbing $CO_2$ (rich solution) is withdrawn from a reservoir at a lower part of the absorption column 20 by an absorption column withdrawal pump 33 and then is heated by a heat exchanger 34, and, subsequently, the rich solution is sent to the regeneration column 40. The rich solution is sprayed from a spray unit 42 inside the regeneration column 40 to be fed to a packing layer 41. Meanwhile, a vapor generated by the reboiler 60 installed at a lower part of the regeneration column 40 is fed to the packing layer 41. The rich solution and the vapor are brought into gas-liquid contact with each other in the packing layer 41, so that the $CO_2$ gas is desorbed from the rich solution. Since the desorbed $CO_2$ gas is entrained with an absorbing solution mist, mist removal is performed in a water washing unit 43 and a demister 45 installed above the water washing unit 43 to be discharged as a $CO_2$ gas 46 from an upper part of the regeneration column 40. After that, the $CO_2$ gas is cooled to about 40° C. by a cooler 47 and then is subjected to separation into a gas and drain water in a $CO_2$ separator 48, so that the $CO_2$ gas is introduced into a $CO_2$ liquefying equipment (not shown) and the drain water is fed to the washing water spraying unit by a drain pump 50.

On the other hand, an absorbing solution from which $CO_2$ is desorbed (lean solution) is stored in a regeneration column reservoir 51 and then is fed to the reboiler 60 through a reboiler solution feeding piping 52. A heat transfer tube and so forth are installed inside the reboiler 60 to heat the lean solution with a water vapor 62 fed to the heat transfer tube through a water vapor feeding piping. A vapor is generated inside the reboiler 60, and the vapor passes through a vapor feeding piping 65 to be fed to the regeneration column 40. The water vapor 62 used in the reboiler 60 becomes water inside the heat transfer tube to be recovered. The absorbing solution stored in the reservoir at the lower part of the regeneration column 40 is fed to a flash tank 91 through a regeneration column withdrawal piping 66. The absorbing solution is converted into a vapor by flash evaporation in the flash tank 91. The vapor is recompressed by a recompressor 92 and then fed to the regeneration column 40 to be reused as a heat source. A liquid phase part of the flash tank 91 is increased in pressure by a pump 93 and reduced in temperature by the heat exchanger 34 and the cooler 29 and then is fed to the $CO_2$ absorption column 20.

SUMMARY OF THE INVENTION

Problems to be Resolved by the Invention

Though the above-described conventional technology has the advantage of reusing the vapor recompressed by the recompressor 92 as the heat source by feeding the recompressed vapor to the regeneration column 40, the technology has the disadvantage of deterioration or loss of the absorbing solution since the absorbing solution is excessively heated due to the temperature increase in the regeneration column by the vapor fed to the regeneration column.

As one of methods for temperature control in the regeneration column 40, a method of controlling an amount per se of the vapor generated from the vapor recompression equipment having the compressor and the like to be fed to the regeneration column 40 may be contemplated. However, the vapor generation amount depends on a gas phase/liquid phase ratio of the absorbing solution in the flash tank 91. It is necessary to continuously feed a constant amount of the absorbing solution (liquid phase) pooled at the bottom of the flash tank to the $CO_2$ absorption column 20. If the gas phase/liquid phase ratio was changed in order to change the vapor generation amount, a material balance in the flash tank 91 is lost to entail unstable feeding of the absorbing solution (liquid phase) to the $CO_2$ absorption column 20 or generation of surplus vapor, thereby making it difficult to employ the method as an efficient method of using the heat source.

An object of the present invention is to provide a carbon dioxide ($CO_2$) chemical absorption system installed with a vapor recompression equipment and an exhaust gas treatment system comprising the carbon dioxide chemical absorption system, each of which is capable of utilizing a vapor obtained by flash-evaporating a part of an absorbing solution withdrawn from the regeneration column as a heat source of a regeneration column by recompressing the vapor and of suppressing deterioration of the absorbing solution otherwise caused by excessive heating by adjusting a temperature of the vapor to be within a predetermined range (for example, 110° C. to 120° C.).

Means for Solving the Problems

The inventors conducted researches in order to solve the above-described problem and found that it is possible to simultaneously attain efficient use of a vapor and suppression of deterioration of an absorbing solution by adjusting a temperature of a vapor recompressed by the compressor 92 to be within a predetermined range by a temperature control device before feeding the recompressed vapor to the regeneration column 40 to accomplish the present invention consisting of the following modes based on the findings.

1). An exhaust gas treatment system comprising:
   a $CO_2$ chemical absorption equipment comprising an absorption column which absorbs carbon dioxide ($CO_2$) in a combustion exhaust gas discharged from a combustion device with the use of an absorbing solution comprising an amine compound as a main component and a regeneration column which regenerates the absorbing solution by desorbing $CO_2$ from the absorbing solution which absorbed $CO_2$;
   a flash tank which depressurizes the absorbing solution withdrawn from a lower part of the regeneration column to flash-evaporate the absorbing solution;
   a vapor recompression equipment which compresses the vapor generated by the flash tank;
   a temperature control device which adjusts the vapor compressed by the vapor recompression equipment to be within a predetermined temperature; and
   a piping for feeding the vapor adjusted to the predetermined temperature by the temperature control device to the regeneration column.

2.) The exhaust gas treatment system according to 1.), wherein the temperature control device adjusts the temperature of the compressed vapor by using a part of a solution circulating inside the $CO_2$ chemical absorption equipment as a coolant.

3.) The exhaust gas treatment system according to 1.) or 2.), wherein the temperature control device comprises a cooler which is capable of cooling the vapor by directly spraying the coolant to the vapor compressed by the vapor recompression equipment; or a heat exchanger which is capable of cooling the vapor by heat exchange between the vapor compressed by the vapor recompression equipment and the coolant.

4.) The exhaust gas treatment system according to any one of 1.) to 3.), further comprising a piping which feeds to the temperature control device a part of the absorbing solution circulating inside the $CO_2$ chemical absorption equipment as a coolant.

5.) The exhaust gas treatment system according to any one of 1.) to 3.), further comprising a piping which feeds to the temperature control device a part of the absorbing solution withdrawn from the lower part of the regeneration column as a coolant.

6.) The exhaust gas treatment system according to any one of 1.) to 3.), further comprising a piping which feeds to the temperature control device a part of the absorbing solution to be fed to the absorption column as a coolant.

7.) The exhaust gas treatment system according to any one of 1.) to 3.), further comprising a piping which feeds to the temperature control device a part of the absorbing solution (drain water) to be fed to a water washing spray unit of the regeneration column as a coolant.

8.) The exhaust gas treatment system according to any one of 1.) to 3.), further comprising a piping which feeds process water as a coolant to the temperature control device.

9.) A carbon dioxide chemical absorption system comprising: a $CO_2$ chemical absorption equipment comprising an absorption column which absorbs carbon dioxide ($CO_2$) in a carbon dioxide-containing gas with the use of an absorbing solution comprising an amine compound as a main component and a regeneration column which regenerates the absorbing solution by desorbing $CO_2$ from the absorbing solution which absorbed $CO_2$;
   a flash tank which depressurizes the absorbing solution withdrawn from a lower part of the regeneration column to flash-evaporate the absorbing solution;
   a vapor recompression equipment which compresses the vapor generated by the flash tank;
   a temperature control device which adjusts the vapor compressed by the vapor recompression equipment to be within a predetermined temperature; and
   a piping for feeding the vapor adjusted to the predetermined temperature by the temperature control device to the regeneration column.

Advantageous Effects of the Invention

Since each of a carbon dioxide ($CO_2$) chemical absorption system installed with a vapor recompression equipment and an exhaust gas treatment system comprising the carbon dioxide chemical absorption system in the present invention is capable of using a vapor obtained by flash-evaporating a part of an absorbing solution withdrawn from a regeneration column as a heat source of the regeneration column by recompressing the vapor, each of the systems is capable of improving plant thermal efficiency by reducing an amount of water vapor to be fed to a reboiler 60. Further, each of the carbon dioxide chemical absorption system and the exhaust gas treatment system in the present invention is capable of suppressing deterioration of the absorbing solution otherwise caused by excessive heating without breaking a material balance inside a flash tank since a temperature control device adjusts a temperature of the recompressed vapor to be within a predetermined range (for example, 110° C. to 120° C.).

EMBODIMENTS FOR CARRYING OUT THE INVENTION

Figure 1:
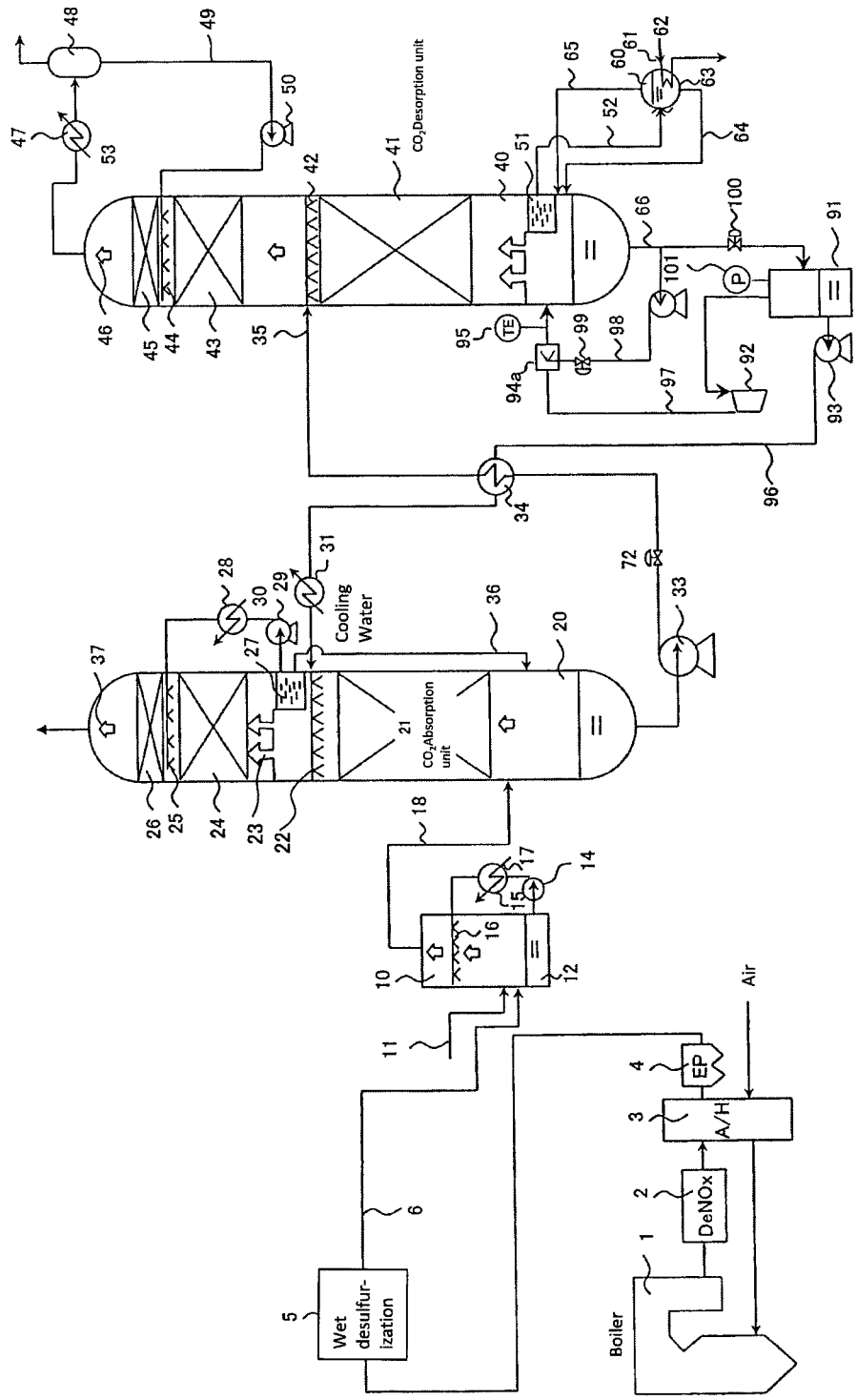
FIG. 1 is a diagram showing a power plant comprising a $CO_2$ chemical absorption system of Embodiment 1 in the present invention.

In order to avoid a loss by deterioration of an absorbing solution inside a regeneration column 40, it is necessary to maintain the inside of the regeneration column 40 (mainly a lower part of a packing layer) to a predetermined temperature (for example, 110° C. to 120° C.), and, in the present invention, prevention of an increase in temperature (including a local temperature) inside the regeneration column 40 is enabled by controlling a vapor generated by a vapor recompression equipment to the predetermined temperature range with the use of a temperature control device. A coolant is used in the temperature control device. As the coolant, a part of a solution circulating inside the $CO_2$ chemical absorption equipment may preferably be used. Examples of the solution to be circulated in the $CO_2$ chemical absorption equipment include plant water (cooling water), an absorbing solution, and the like. Among these, it is preferable to use a part of the absorbing solution circulating inside the $CO_2$ chemical absorption equipment as the coolant, and it is more preferable to use a part of the absorbing solution withdrawn from a lower part of the regeneration column, a part of the absorbing solution to be fed to an absorption column, or a part of the absorbing solution (drain water) to be fed to a water washing spray unit of the regeneration column. Any of the temperature control device may be used. For example, the temperature control device is installed with a cooler for bringing the coolant into direct contact with the vapor by spraying the coolant using a spray nozzle and the like to a vapor piping 97, a heat exchanger which reduces a temperature of the vapor by bringing the coolant into indirect contact with the vapor using a heat transfer unit or the like, and so forth.

In order to avoid a loss by deterioration of an absorbing solution inside a regeneration column 40, it is necessary to maintain the inside of the regeneration column 40 (mainly a lower part of a packing layer) to a predetermined temperature (for example, 110° C. to 120° C.), and, in the present invention, prevention of an increase in temperature (including a local temperature) inside the regeneration column 40 is enabled by controlling a vapor generated by a vapor recompression equipment to the predetermined temperature range with the use of a temperature control device. A coolant is used in the temperature control device. As the coolant, a part of a solution circulating inside the $CO_2$ chemical absorption equipment may preferably be used. Examples of the solution to be circulated in the $CO_2$ chemical absorption equipment include plant water (cooling water), an absorbing solution, and the like. Among these, it is preferable to use a part of the absorbing solution circulating inside the $CO_2$ chemical absorption equipment as the coolant, and it is more preferable to use a part of the absorbing solution withdrawn from a lower part of the regeneration column, a part of the absorbing solution to be fed to an absorption column, or a part of the absorbing solution (drain water) to be fed to a water washing spray unit of the regeneration column. Any of the temperature control device may be used. For example, the temperature control device is installed with a cooler for bringing the coolant into direct contact with the vapor by spraying the coolant using a spray nozzle and the like to a vapor piping 97, a heat exchanger which reduces a temperature of the vapor by bringing the coolant into indirect contact with the vapor using a heat transfer unit or the like, and so forth.

Further, in the case where the part of the absorbing solution circulating inside the $CO_2$ chemical absorption equipment is used as the coolant, since the utilization of the heat energy for the temperature decrease of the vapor generated by the vapor recompression equipment actually causes a shift of the heat energy to the absorbing solution, a loss of the heat energy due to the temperature decrease of the vapor does not exist in the system in principle. In other words, the heat utilized for the temperature decrease of the vapor is efficiently returned to the regeneration column 40 via the absorbing solution as a result of performing the vapor temperature control before feeding the vapor to the regeneration column 40.

EXAMPLES

The present invention will be described in more details in conjunction with Embodiment 1 shown in FIG. 1.

Figure 8:
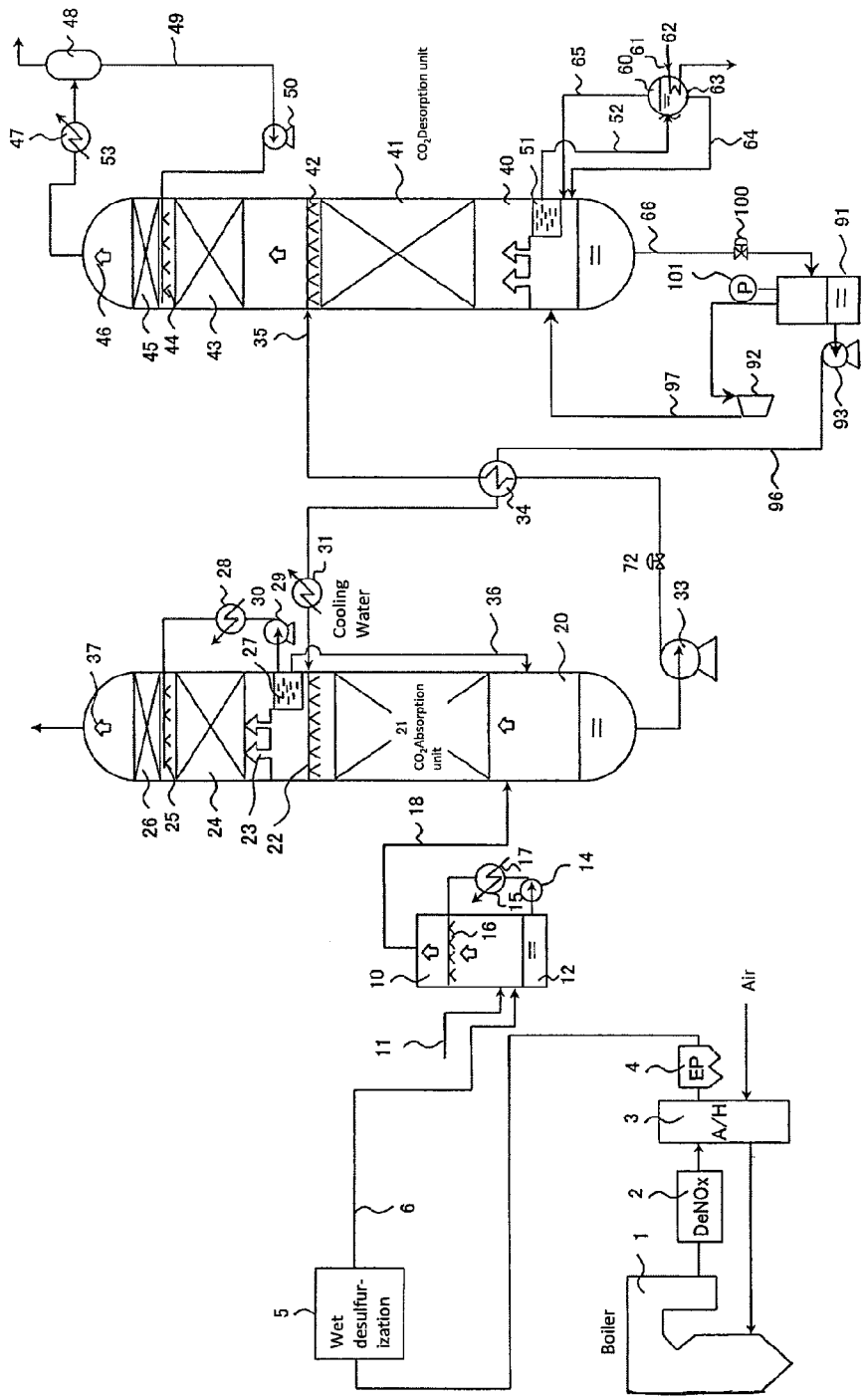
FIG. 8 is a diagram showing a power plant comprising the conventional $CO_2$ chemical absorption system.

Embodiment 1 according to the present invention is different from the embodiment according to the conventional technology shown in FIG. 8 in the feature that a part of an absorbing solution withdrawn from a regeneration column 40 is used as a coolant for cooling a vapor generated by a flash tank 91 and recompressed by a recompressor 92 and the like in order to control the vapor to be fed to the regeneration column 40 to an optimum temperature (for example, 110° C. to 120° C.). More specifically, as shown in FIG. 1, a branch piping 98 for partially withdrawing the absorbing solution from an absorbing solution withdrawal piping 66 extending from the regeneration column 40 to the flash tank 91 is installed. A cooler 94a is installed in a compressed vapor piping 97. The absorbing solution is sprayed by using a spray nozzle 98 and the like in the cooler 94a to bring the absorbing solution into direct contact with the recompressed vapor, thereby attaining a reduction in temperature of the vapor. Further, an amount of the absorbing solution to be fed to the cooler 94a is controlled by using a control valve 99 in response to a temperature signal from a temperature detector 95 installed in the compressed vapor piping 97 to maintain the temperature of the vapor to be fed to the regeneration column 40 within the predetermined range.

In order to maintain $CO_2$ absorption capability, it is necessary to continuously feed a constant amount of the absorbing solution which is fed to a $CO_2$ absorption column 20 from the flash tank 91 by an absorbing solution feeding pump 93. Therefore, the absorbing solution amount to be fed to the flash tank 91 is made constant by a control valve 100, and, simultaneously, a pressure inside the flash tank 91 is controlled to be constant. Thus, a gas-liquid balance inside the flash tank 91 is kept constant, thereby enabling to feed the constant amount of vapor to the regeneration column and to feed the constant amount of absorbing solution to the absorption column. As compared to the case of externally spraying a cooling medium such as plant water, the use of the absorbing solution circulating inside the $CO_2$ chemical absorption equipment is advantageous since the use of absorbing solution enables to return the entire amount of heat at an outlet of the compressor 92 to the regeneration column 40 without breaking the water balance of the system as a whole.

Figure 7:
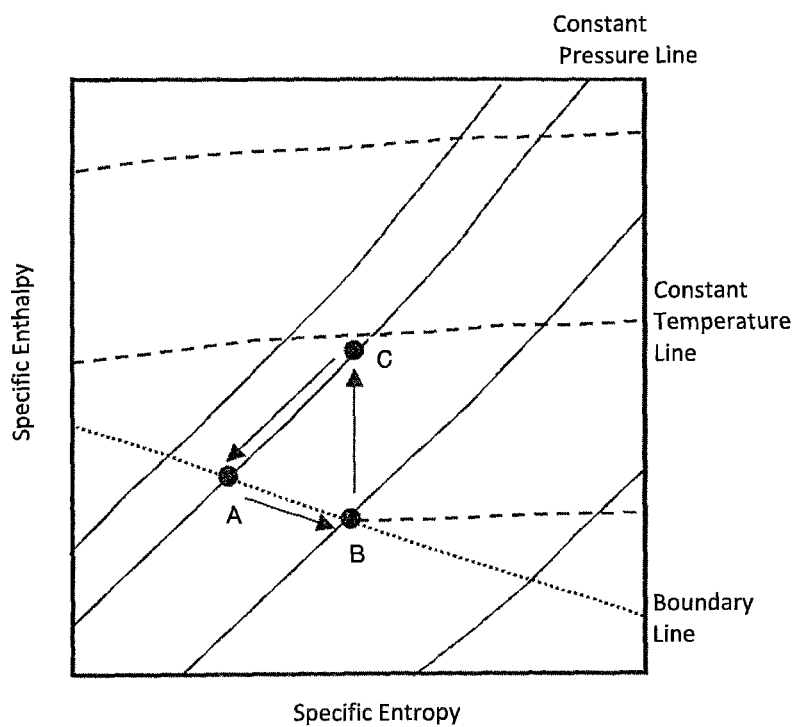
FIG. 7 is a diagram showing an H-S graph illustrating an operation principle of the present invention.

FIG. 7 is a diagram illustrating the basic principle of the present invention by using an H-S graph. In the graph, A indicates internal conditions of the regeneration column 40, B indicates internal conditions of the flash tank 91, and C indicates vapor conditions before the feeding to the regeneration column 40. The inside of the regeneration column 40 (A in FIG. 7) is under mildly pressurized conditions due to desorption of $CO_2$ from the absorbing solution and heating via a reboiler 60. The stage A→B indicates a decompression and flashing operation in the flash tank 91, and the vapor generation is attained at the stage. The stage B→C indicates pressurization (adiabatic compression) of the vapor generated by the flash tank 91. In the present invention, the recompressor 92 is used at the stage B→C, and the vapor is pressurized and heated at the stage B→C. The stage C→A indicates the stage where the vapor is used as a heat source in the regeneration column 40. In the present invention, the vapor is fed to the regeneration column 40 after the vapor temperature is controlled at the stage.

Embodiments 2 to 6 according to the present invention are shown in FIG. 2 to FIG. 6, respectively.

Figure 2:
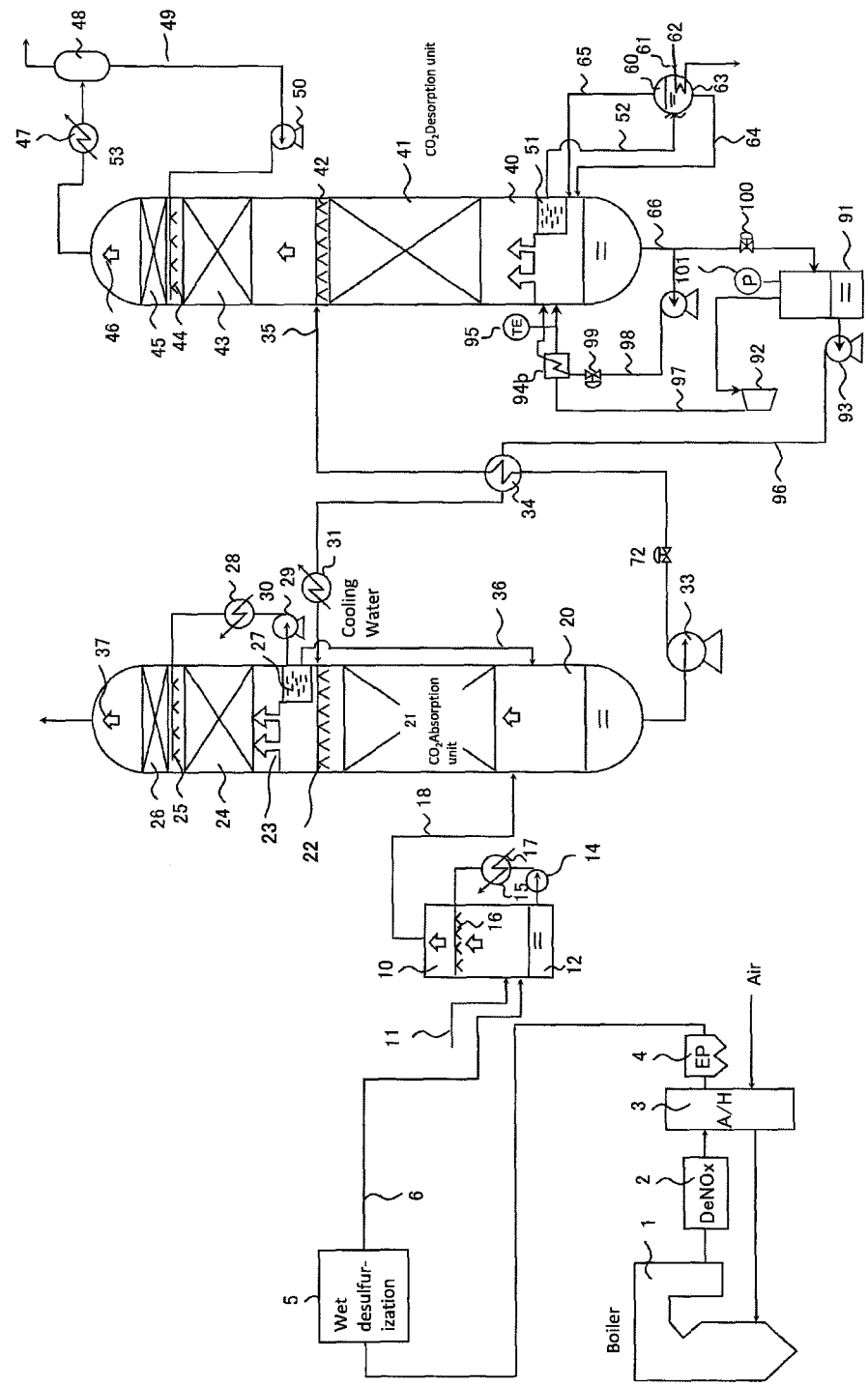
FIG. 2 is a diagram showing a power plant comprising a $CO_2$ chemical absorption system of Embodiment 2 in the present invention.

Embodiment 2 shown in FIG. 2 is the same as Embodiment 1 except that the cooler 94a installed in the compressed vapor piping 97 is changed to a heat exchanger 94b. The absorbing solution fed from the piping 98 branched from the $CO_2$ withdrawal piping 66 to the heat exchanger 94b is utilized as a coolant for cooling the vapor inside the compressed vapor piping 97. In Embodiment 2, the coolant and the vapor is brought into indirect contact via a heat transfer tube for heat exchange. An amount of the absorbing solution to be fed to the heat exchanger 94b is controlled by using the control valve 99 in response to a temperature signal from the temperature detector 95 installed in the compressed vapor piping 97 in the same manner as in the control method according to Embodiment 1 shown in FIG. 1 to maintain a temperature of the vapor to be fed to the regeneration column 40 within a predetermined range (for example, 110° C. to 120° C.). The absorbing solution utilized as the coolant for cooling the vapor is returned to the regeneration column 40. As compared to the case of using an external medium such as cooling water as the coolant, the use of the absorbing solution is advantageous since the use of absorbing solution enables to return the heat to the regeneration column 40 without a loss.

Figure 3:
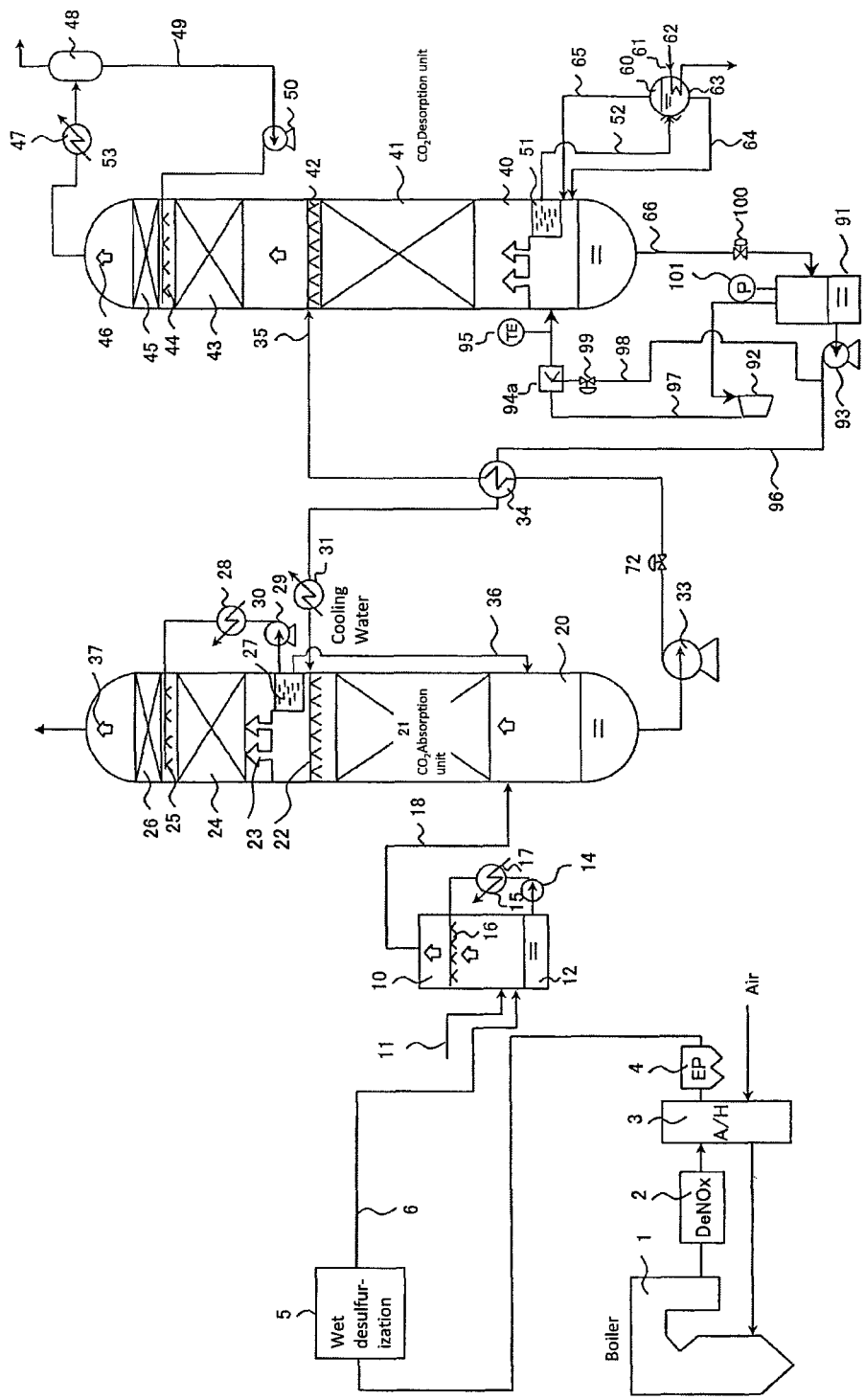
FIG. 3 is a diagram showing a power plant comprising a $CO_2$ chemical absorption system of Embodiment 3 in the present invention.

Embodiment 3 shown in FIG. 3 is the same as Embodiment 1 except that an absorbing solution after the flash operation in the flash tank 91 is used as the coolant to be fed to the compressed vapor piping 97 in place of the absorbing solution withdrawn from the regeneration column 40. More specifically, the piping 98 branched from a piping 96 for feeding the absorbing solution to the $CO_2$ absorption column 20 is placed, and the absorbing solution is sprayed by using the spray nozzle 98 and the like inside the cooler 94a installed in the compressed vapor piping 97, thereby bringing the absorbing solution into direct contact with the compressed vapor for cooling. An amount of the absorbing solution to be fed to the cooler 94a is controlled by using the control valve 99 in response to a temperature signal from the temperature detector 95 installed in the compressed vapor piping 97 to maintain a temperature of the vapor to be fed to the regeneration column 40 within a predetermined range (for example, 110° C. to 120° C.). As compared to the case of externally spraying a cooling medium such as plant water, the use of the absorbing solution circulating inside the $CO_2$ chemical absorption equipment is advantageous since the use of absorbing solution enables to return the entire amount of heat at an outlet of the compressor 92 to the regeneration column 40 without breaking the water balance of the system as a whole.

Figure 4:
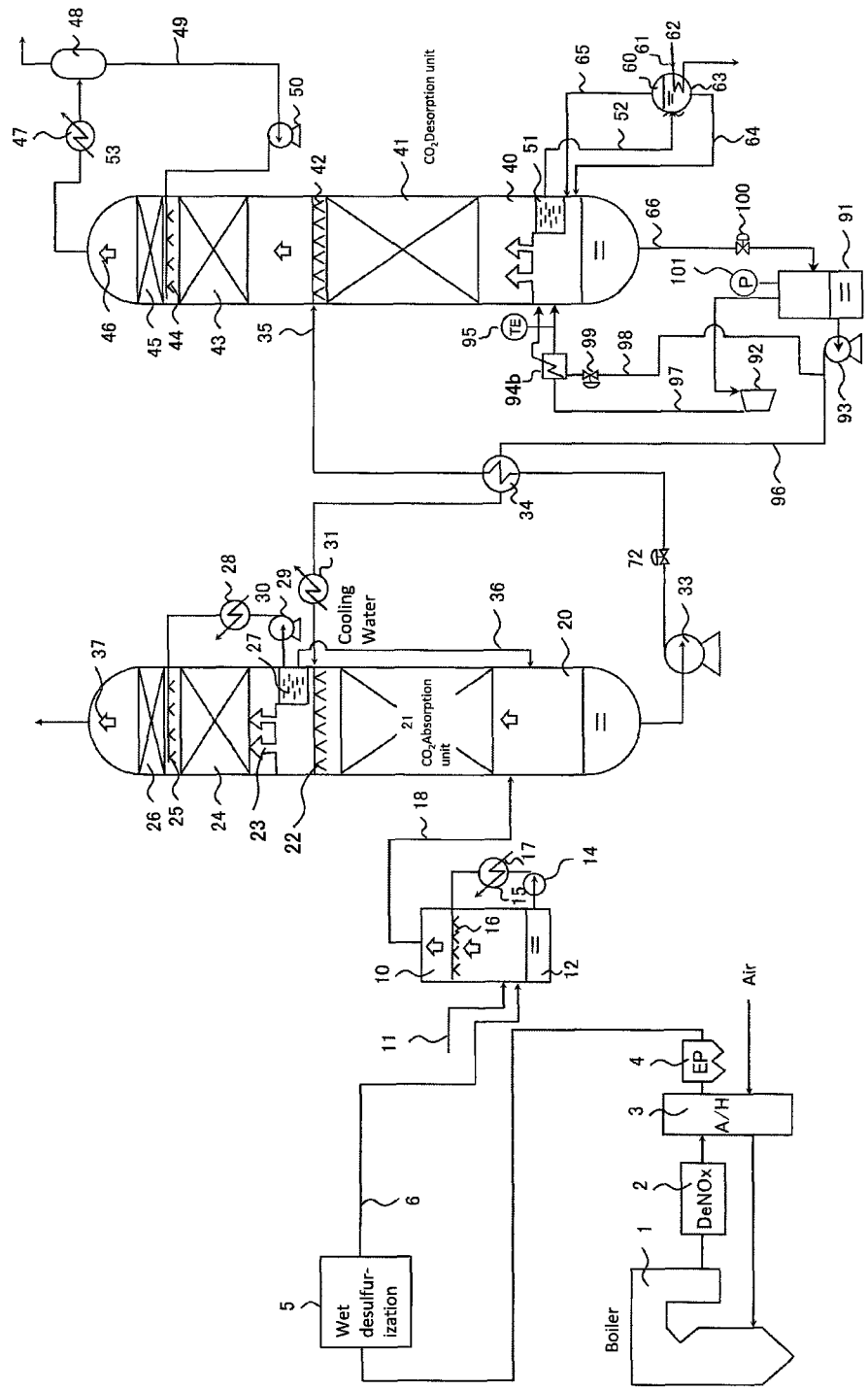
FIG. 4 is a diagram showing a power plant comprising a $CO_2$ chemical absorption system of Embodiment 4 in the present invention.

Embodiment 4 shown in FIG. 4 is the same as Embodiment 3 except that the cooler 94a installed in the compressed vapor piping 97 is changed to a heat exchanger 94b. The absorbing solution fed through the piping 98 branched from the absorbing solution feeding piping 96 to the $CO_2$ absorption column 20 is brought into indirect contact with a coolant in the heat exchanger 94b. An amount of the absorbing solution to be fed to the heat exchanger 94b is controlled by using the control valve 99 in response to a temperature signal from the temperature detector 95 installed in the compressed vapor piping 97 in the same manner as described above to maintain a temperature of the vapor to be fed to the regeneration column 40 within a predetermined range (for example, 110° C. to 120° C.). The absorbing solution utilized as the coolant for cooling the vapor is returned to the regeneration column 40. As compared to the case of using an external medium such as cooling water as the coolant, the use of the absorbing solution is advantageous since the use of absorbing solution enables to return the heat to the regeneration column 40 without a loss.

Figure 5:
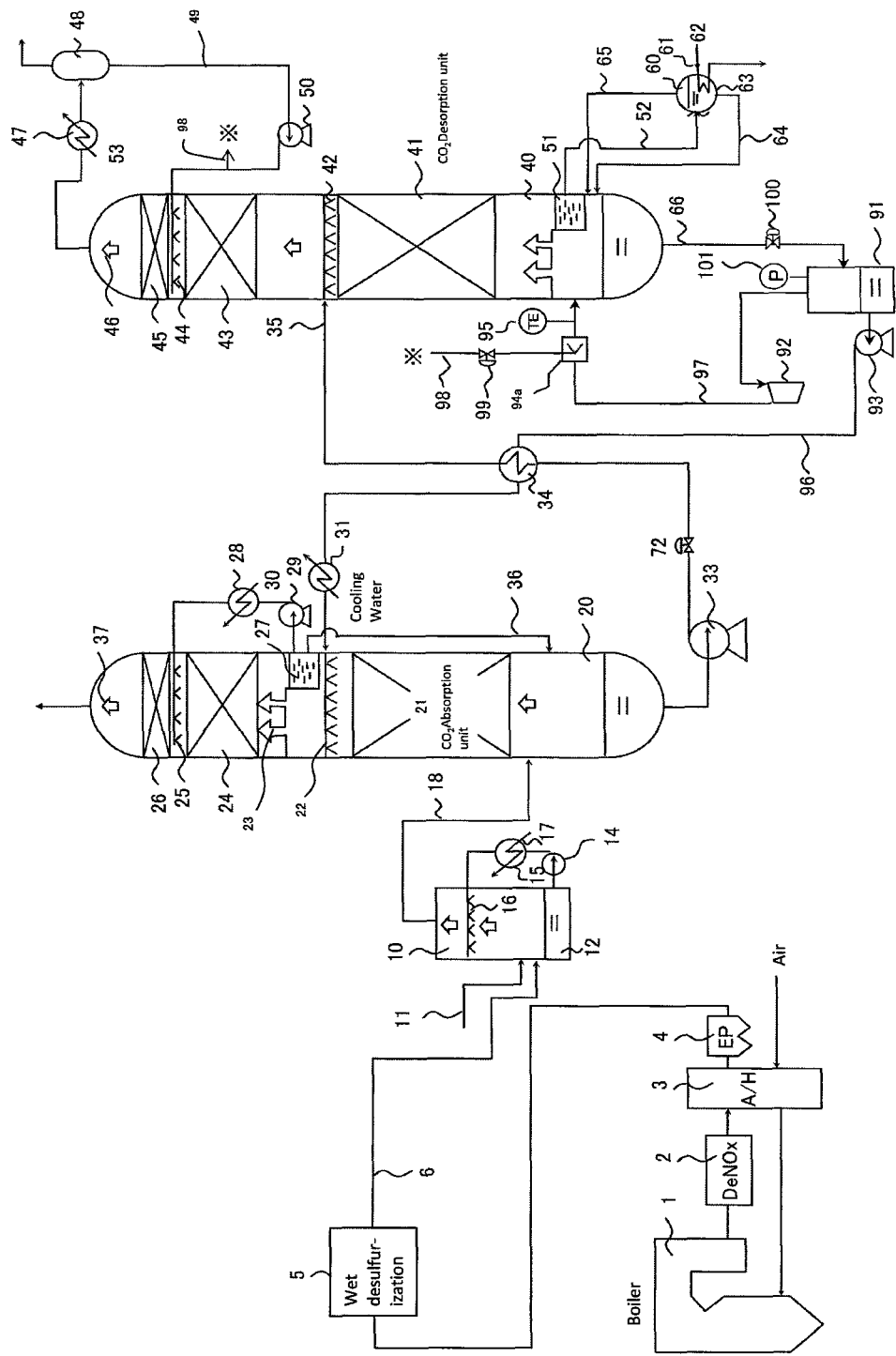
FIG. 5 is a diagram showing a power plant comprising a $CO_2$ chemical absorption system of Embodiment 5 in the present invention.

Embodiment 5 shown in FIG. 5 is the same as Embodiment 1 except that an absorbing solution (drain water) to be fed to a water washing spray unit of the regeneration column is used as the coolant to be fed to the compressed vapor piping 97 in place of the absorbing solution withdrawn from the regeneration column 40. The piping 98 partially branched from a drain tube is installed, and the drain water is directly sprayed inside the cooler 94a installed in the compressed vapor piping 97 by using the spry nozzle 98 and the like. Since the drain water of a $CO_2$ separator 48 has a low amine concentration, the drain water in the case where it is directly sprayed as the coolant to the vapor piping 97 by using the spray nozzle 98 and the like is more readily vaporized as compared to the absorbing solution withdrawn from the regeneration column 40. Therefore, an amount of the sprayed coolant to be vaporized is increased to reduce the amount of the coolant to be returned to the regeneration column 40, thereby bringing about the advantage of relatively reducing the spray amount and reducing an equipment cost. As compared to the case of externally spraying a cooling medium such as plant water, the use of the absorbing solution circulating inside the $CO_2$ chemical absorption equipment is advantageous since the use of absorbing solution enables to return the entire amount of heat at an outlet of the compressor 92 to the regeneration column 40 without breaking the water balance of the system as a whole.

Figure 6:
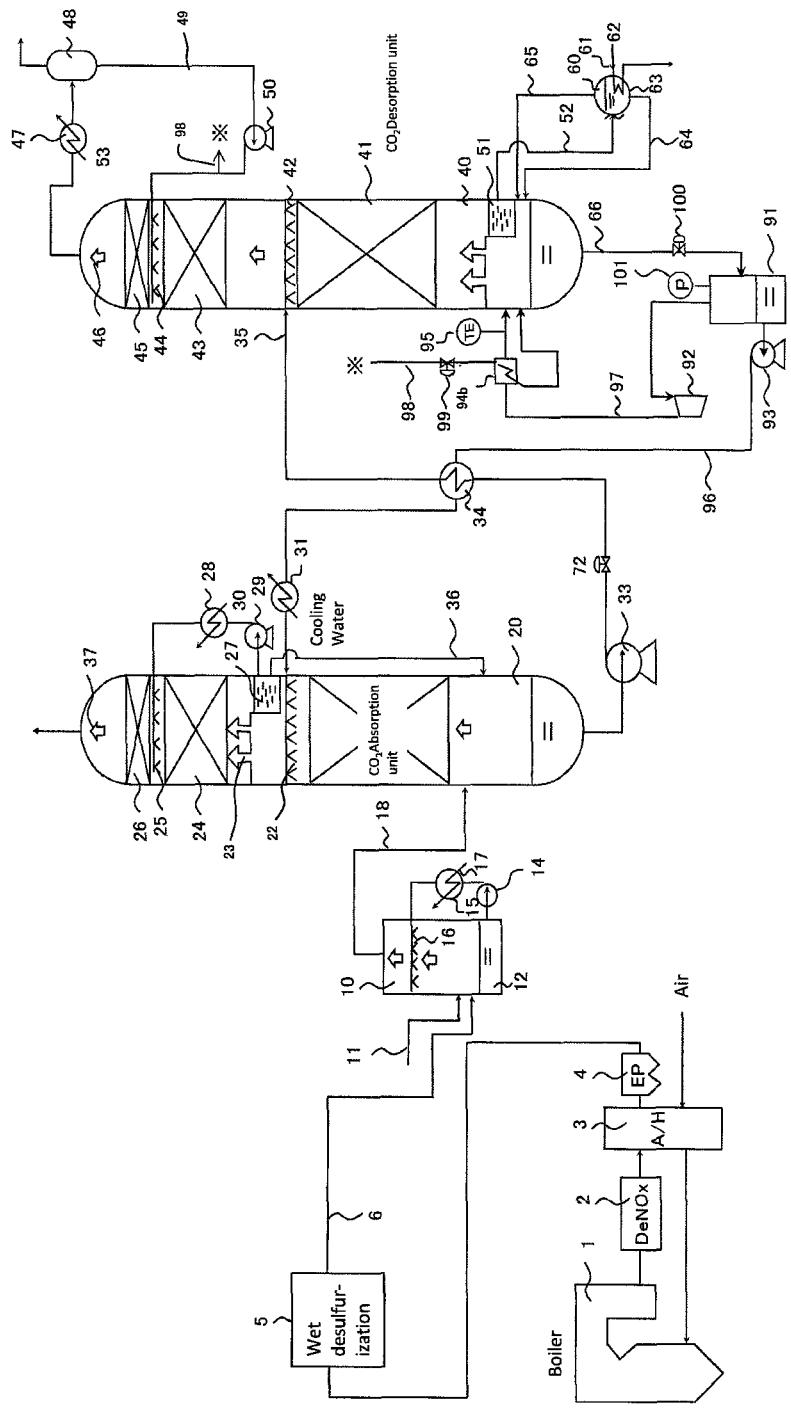
FIG. 6 is a diagram showing a power plant comprising a $CO_2$ chemical absorption system of Embodiment 6 in the present invention.

Embodiment 6 shown in FIG. 6 is the same as Embodiment 5 except that the cooler 94a installed in the compressed vapor piping 97 is changed to a heat exchanger 94b. The absorbing solution fed through the piping 98 branched from the absorbing solution feeding piping 96 to the $CO_2$ absorption column 20 is brought into indirect contact with a coolant in the heat exchanger 94b. An amount of the absorbing solution to be fed to the heat exchanger 94b is controlled by using the control valve 99 in response to a temperature signal from the temperature detector 95 installed in the compressed vapor piping 97 in the same manner as described above to maintain a temperature of the vapor to be fed to the regeneration column 40 within a predetermined range (for example, 110° C. to 120° C.). The absorbing solution utilized as the coolant for cooling the vapor is returned to the regeneration column 40. As compared to the case of using an external medium such as cooling water as the coolant, the use of the absorbing solution is advantageous since the use of absorbing solution enables to return the heat to the regeneration column 40 without a loss.

EXPLANATION OF SYMBOLS

1: boiler
2: denitrification device
3: air heater
4: dry electric dust collector
5: wet desulfurization device
6: desulfurized outlet exhaust gas
10: prescrubber
11: absorbing agent
12: reservoir
14: circulation pump
15: cooler
16: spray unit
17: cooling water
18: prescrubber outlet gas
20: absorption column
21: packing layer ($CO_2$ absorption unit)
22: absorbing solution spray unit
23: non-$CO_2$ gas
24: water washing unit
25: water washing spray unit
26: demister
27: absorption column washing water reservoir
28: cooler
29: washing water pump
30: cooling water
31: cooler
33: absorption column withdrawal pump
34: heat exchanger
35: regeneration column solution feeding piping
36: washing water withdrawal piping
37: treated gas
40: regeneration column
41: packing layer ($CO_2$ desorption unit)
42: spray unit
43: water washing unit
44: water washing spray unit
45: demister
46: $CO_2$ gas
47: cooler
48: $CO_2$ separator
49: drain piping
50: drain pump
51: regeneration column solution reservoir
52: reboiler solution feeding piping
53: cooling water 60: reboiler
61: water vapor feeding piping
62: water vapor
63: reboiler solution reservoir
64: reboiler solution withdrawal piping
65: vapor feeding piping
66: regeneration column withdrawal piping
72: valve
91: flash tank
92: compressor
93: pump
94a: cooler
94b: heat exchanger
95: temperature detector
96: asorbing solution feeding piping
97: vapor piping
98: piping
99: control valve
100: control valve
101: pressure meter

The invention claimed is:

1. An exhaust gas treatment system comprising:
a $CO_2$ chemical absorption equipment comprising an absorption column which absorbs carbon dioxide ($CO_2$) in a combustion exhaust gas discharged from a combustion device with the use of an absorbing solution comprising an amine compound as a main component and a regeneration column which regenerates the absorbing solution by desorbing $CO_2$ from the absorbing solution which absorbed $CO_2$;
a flash tank which depressurizes the absorbing solution withdrawn from a lower part of the regeneration column to flash-evaporate the absorbing solution;
a vapor recompression equipment which compresses a vapor generated by the flash tank;
a temperature control device which adjusts a vapor compressed by the vapor recompression equipment to be within a predetermined temperature; a piping for feeding the vapor adjusted to the predetermined temperature by the temperature control device to the regeneration column; and
a piping which feeds to the temperature control device a part of the absorbing solution withdrawn from a lower part of the flash tank as a coolant.

2. The exhaust gas treatment system according to claim 1, wherein the temperature control device comprises a cooler which is capable of cooling the compressed vapor by directly spraying the coolant to the compressed vapor or a heat exchanger which is capable of cooling the compressed vapor by heat exchange between the compressed vapor and the coolant.

3. An exhaust gas treatment system comprising:
a $CO_2$ chemical absorption equipment comprising an absorption column which absorbs carbon dioxide ($CO_2$) in a combustion exhaust gas discharged from a combustion device with the use of an absorbing solution comprising an amine compound as a main component and a regeneration column which regenerates the absorbing solution by desorbing $CO_2$ from the absorbing solution which absorbed $CO_2$;
a flash tank which depressurizes the absorbing solution withdrawn from a lower part of the regeneration column to flash-evaporate the absorbing solution;
a vapor recompression equipment which compresses a vapor generated by the flash tank;
a temperature control device which adjusts a vapor compressed by the vapor recompression equipment to be within a predetermined temperature;

a piping for feeding the vapor adjusted to the predetermined temperature by the temperature control device to the regeneration column; and a piping which feeds to the temperature control device a part of the absorbing solution withdrawn from the lower part of the regeneration column as a coolant.

4. The exhaust gas treatment system according to claim 3, wherein the temperature control device adjusts the temperature of the compressed vapor by using the coolant.

5. The exhaust gas treatment system according to claim 3, wherein the temperature control device comprises a cooler which is capable of cooling the compressed vapor by directly spraying the coolant to the compressed vapor or a heat exchanger which is capable of cooling the compressed vapor by heat exchange between the compressed vapor and the coolant.

6. A carbon dioxide chemical absorption system comprising:

a $CO_2$ chemical absorption equipment comprising an absorption column which absorbs carbon dioxide ($CO_2$) in a carbon dioxide-containing gas with the use of an absorbing solution comprising an amine compound as a main component and a regeneration column which regenerates the absorbing solution by desorbing $CO_2$ from the absorbing solution which absorbed $CO_2$;

a flash tank which depressurizes the absorbing solution withdrawn from a lower part of the regeneration column to flash-evaporate the absorbing solution;

a vapor recompression equipment which compresses a vapor generated by the flash tank;

a temperature control device which adjusts a vapor compressed by the vapor recompression equipment to be within a predetermined temperature; a piping for feeding a vapor adjusted to the predetermined temperature by the temperature control device to the regeneration column; and a piping which feeds to the temperature control device a part of the absorbing solution withdrawn from a lower part of the flash tank as a coolant.

7. The exhaust gas treatment system according to claim 6, wherein the temperature control device comprises a cooler which is capable of cooling the vapor by directly spraying the coolant to the compressed vapor or a heat exchanger which is capable of cooling the compressed vapor by heat exchange between the compressed vapor and the coolant.

* * * * *